(12) United States Patent
Julisch et al.

(10) Patent No.: US 8,826,455 B2
(45) Date of Patent: Sep. 2, 2014

(54) METHOD AND APPARATUS FOR AUTOMATED ASSIGNMENT OF ACCESS PERMISSIONS TO USERS

(75) Inventors: Klaus Julisch, Bonstetten (CH); Guenter Karjoth, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 1352 days.

(21) Appl. No.: 12/372,195

(22) Filed: Feb. 17, 2009

(65) Prior Publication Data
US 2010/0211989 A1   Aug. 19, 2010

(51) Int. Cl.
G06F 21/00 (2013.01)
G06F 21/60 (2013.01)

(52) U.S. Cl.
CPC .................................. G06F 21/604 (2013.01)
USPC .......... 726/28; 726/26; 726/27; 726/2; 726/3; 726/16

(58) Field of Classification Search
CPC ..................................................... G06F 21/604
USPC .................................. 726/28, 26, 27, 2, 3, 16
See application file for complete search history.

(56) References Cited

U.S. PATENT DOCUMENTS

| | | | | |
|---|---|---|---|---|
| 5,265,221 A * | 11/1993 | Miller | | 711/163 |
| 2002/0055839 A1 * | 5/2002 | Jinnai et al. | | 704/240 |
| 2002/0099947 A1 * | 7/2002 | Evans | | 713/193 |
| 2002/0143772 A1 * | 10/2002 | Gottsman | | 707/10 |
| 2002/0150966 A1 * | 10/2002 | Muraca | | 435/40.5 |
| 2002/0156756 A1 * | 10/2002 | Stanley et al. | | 706/47 |
| 2002/0158904 A1 * | 10/2002 | Gunter et al. | | 345/755 |
| 2002/0198907 A1 * | 12/2002 | Klapper et al. | | 707/503 |
| 2003/0051026 A1 * | 3/2003 | Carter et al. | | 709/224 |
| 2003/0117434 A1 * | 6/2003 | Hugh | | 345/744 |
| 2003/0182461 A1 * | 9/2003 | Stelting et al. | | 709/310 |
| 2003/0191777 A1 * | 10/2003 | Lumsden et al. | | 707/104.1 |
| 2004/0010699 A1 * | 1/2004 | Shao et al. | | 713/189 |
| 2004/0085363 A1 * | 5/2004 | Lawrence | | 345/802 |
| 2004/0230492 A1 * | 11/2004 | Park | | 705/26 |
| 2005/0055573 A1 * | 3/2005 | Smith | | 713/201 |
| 2005/0266836 A1 * | 12/2005 | Shan | | 455/417 |
| 2006/0074913 A1 * | 4/2006 | O'Sullivan et al. | | 707/9 |
| 2006/0080541 A1 * | 4/2006 | Monaco et al. | | 713/182 |
| 2006/0101057 A1 * | 5/2006 | Farkkila | | 707/102 |

OTHER PUBLICATIONS

Kemmerer; Shared resource matrix methodology: an approach to identifying storage and timing channels; Journal ACM Transactions on Computer Systems (TOCS) TOCS Homepage archive; vol. 1 Issue 3, Aug. 1983; pp. 256-277; ACM Digital Library.*

(Continued)

*Primary Examiner* — Bradley Holder
(74) *Attorney, Agent, or Firm* — Scully, Scott, Murphy & Presser, P.C.; Daniel P. Morris, Esq.

(57) ABSTRACT

Given a new user U or a user whose role in the organization changed, an automated method of the present disclosure in one aspect determines the new or revised access permissions the user should have. In one aspect, the method of the present disclosure automatically determines access rights based on the access rights held by similar users. This general idea, including a formalization of similarity between users, the details of how access rights are determined, and an algorithm to test if the presented methods are safe to use are provided.

25 Claims, 3 Drawing Sheets

(56) References Cited

OTHER PUBLICATIONS

Giunchiglia et al.; ReIBAC: Relation Based Access Control; Semantics, Knowledge and Grid, 2008. SKG '08. Fourth International Conference on; Date of Conference: Dec. 3-5, 2008; pp 3-11; IEEE Xplore.*

Vaidya, Jaideep et al., The Role Mining Problem: Finding a Minimal Descriptive Set of Roles, SACMAT '07, Jun. 20-22, 2007, Sophia Antipolis, France.
Coyne, Edward, Role Engineering, ACM RBAC Workshop, 1996,I-15-I-16, MD, USA.
Ferraiolo, David F., Role-Based Access Controls, 15th National Computer Security Conference, 1992, pp. 554-563, Baltimore, MD.

* cited by examiner

METHOD AND APPARATUS FOR AUTOMATED ASSIGNMENT OF ACCESS PERMISSIONS TO USERS

FIELD OF THE INVENTION

The present disclosure relates to access permissions and security in information technology.

BACKGROUND OF THE INVENTION

In information technology (IT) security, access permissions are expressed as tuples (O, R) that specify the authorization to perform the operation O on the resource R. Examples of operations include read, write, and execute; examples of resources include files, database records, or World Wide Web services.

Access permissions are typically assigned to users to grant them the right to perform the specified operation on the specified resource. In role-based access control (RBAC), access permissions are first assigned to roles, and these roles are then assigned to users. The NIST standard of RBAC (D. Ferraiolo, R. Sandhu, S. Gavrila, D. Kuhn, and R. Chandramouli. Proposed NIST standard for role-based access control. TISSEC, 2001) includes further elements (such as sessions and role hierarchies). In IT systems, it is not unusual that new users are added and/or existing users change their roles frequently. Those new users and those users whose roles have changed need to be assigned new permissions. As many users are added and roles changed, it may become difficult to keep track of the users and their permissions and update them manually. Accordingly, it is desirable to have an automated system and method that assigns permissions automatically.

BRIEF SUMMARY OF THE INVENTION

A method and system for automatically assigning access permissions to users are provided. The method, in one aspect, may comprise determining permission matrix AP, wherein $AP(i,l)$ is set if user $U(i)$ has access permission $P(l)$, wherein i represents an index from 1 to n number of users and l represents an index from 1 to m number of permissions. The method may also include determining attribute matrix A, wherein $A(i,j)$ stores j-th attribute associated with user $U(i)$, wherein j represents an index from 1 to k number of user attributes. The method may further include determining one or more attributes associated with a new user, and determining one or more users from the attribute matrix A that have similar attributes as the new user. The method may also include determining one or more access permissions from the permission matrix AP for said one or more users, and generating a permission vector $p(1, \ldots, m)$ for the new user from the determined access permissions of said one or more users.

A system for automatically assigning access permissions to users, in one aspect, may comprise information of a plurality of users $U(i)$ of an information technology system S, wherein i represents an index from 1 to n number of users and a plurality of permissions $P(l)$, wherein l represents an index from 1 to m number of permissions established in the information technology system S. The system may also include a matrix AP, wherein $AP(i, l)$ is set if user $U(i)$ has access permission $P(l)$. The system may also include one or more user attributes $uA(1)$ to $uA(k)$, where k is a number of defined attributes. The system may further include a first module operable to determine for each user $U(i)$ attribute values of said one or more user attributes $uA(1)$ to $uA(k)$, said first module further operable to determine n×k attribute matrix A, wherein $A(i, j)$ stores attribute value of $uA(j)$ attribute associated with user $U(i)$, wherein j represents an index from 1 to k number of attributes, said first module further operable to test if the matrix AP and matrix A meet a test threshold for use in automatically assigning access permissions to users. The system may also include a second module operable to establish said one or more user attributes $uA(1)$ to $uA(k)$ for a new user U and assign attribute values of $uA(1)$ to $uA(k)$ to the new user U, said second module farther operable to determine one or more user $U(i)$ that have similar attribute values to the attribute values of the new user U, said second module further operable to determine access permission $P(l)$ using the AP matrix for each of said one or more users $U(i)$ that have similar attribute values, said second module further operable to generate a permission vector $p(1, \ldots, m)$ for the new user U from using the access permission $P(l)$ associated with said one or more users $U(i)$ that have similar attribute values.

A program storage device readable by a machine, tangibly embodying a program of instructions executable by the machine to perform one or more methods described herein is also disclosed.

Further features as well as the structure and operation of various embodiments are described in detail below with reference to the accompanying drawings. In the drawings, like reference numbers indicate identical or functionally similar elements.

DETAILED DESCRIPTION

An automated method for assigning and updating access permissions to users is disclosed. More formally, given a new user U or a user whose role in the organization changed, an automated method of the present disclosure in one aspect determines the new or revised access permissions the user should have. In one aspect, the method of the present disclosure automatically determines access rights based on the access rights held by similar users. This general idea, including a formalization of similarity between users, the details of how access rights are determined, and an algorithm to test if the presented methods are safe to use are provided.

Figure 1:
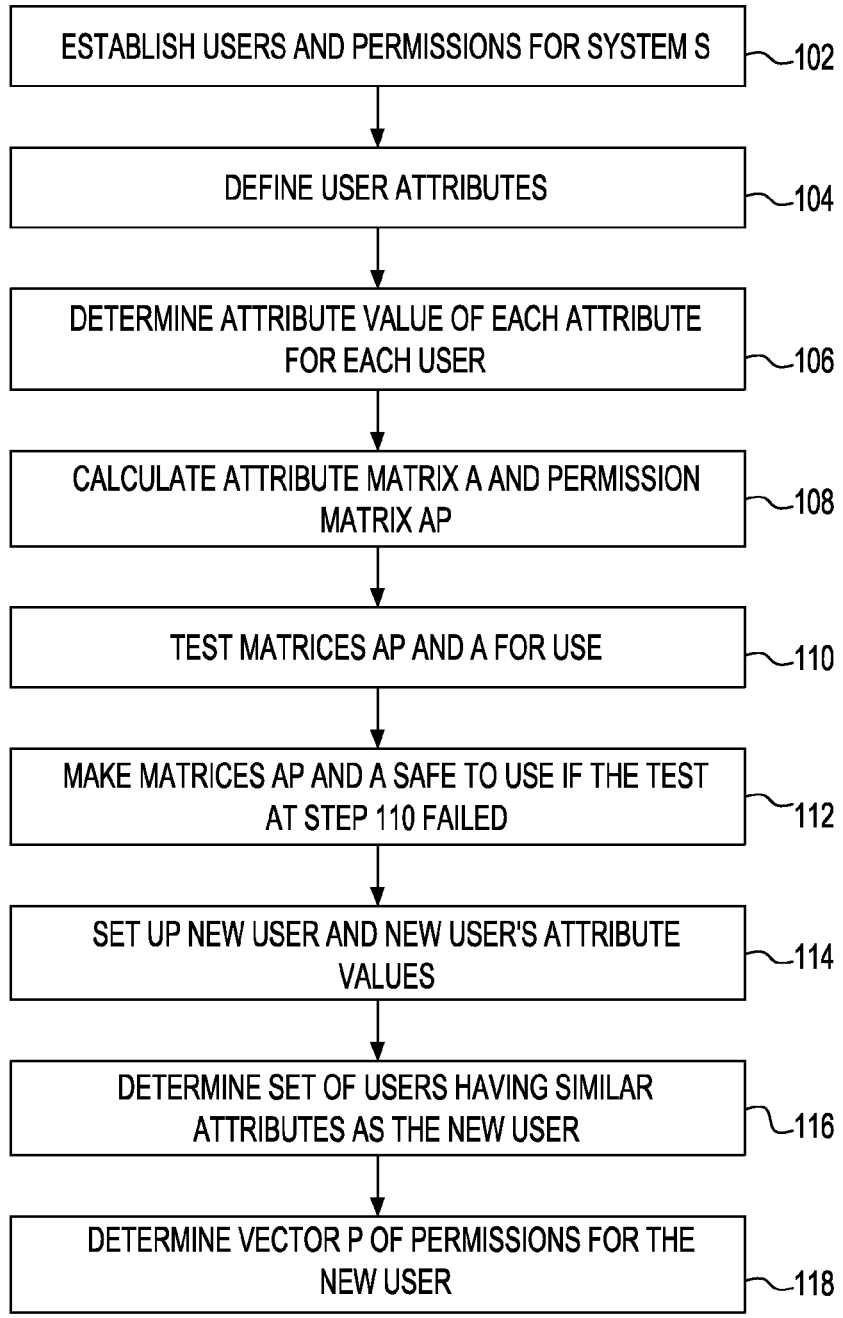
FIG. 1 is a flow diagram for determining access rights in one embodiment of the present disclosure.

FIG. 1 is a flow diagram for determining access rights in one embodiment of the present disclosure. Given an IT system S, let $U1, \ldots, Un$ be the set of existing users and let $P1, \ldots, Pm$ be the set of access permissions as shown at 102. Further, let $AP \in \{0,1\}^{n \times m}$ be the n×m access permission matrix so that $AP[i,j]=1$ if and only if user Ui has access permission Pj, and $AP[i,j]=0$ otherwise.

In one embodiment, the method may comprise two parts: Part I is a one-time effort that prepares the IT system S; Part II is the operational part that determines the access permissions for new or changed users.

Part I: Preparing the IT System S

1. Define user attributes $A1, \ldots, Ak$, which capture user characteristics such as job title, division, department, geography, and so on as shown at 104. One attribute, for example, attribute A1 is defined to be the user's identity in one embodiment. All other attributes are optional and may describe the user's responsibilities and roles within the IT system S. We write Dom(Ai) to designate the domain of potential values that attribute Ai can assume. For example, Dom(Division)={Software, Services, Hardware} may hold.

2. Determine for each user Ui his or her attribute values $A1(Ui), \ldots, Ak(Ui)$ as shown at 106. This information may be available from human resource (HR) databases, or it can be obtained by polling users, or by means of automated, semi-automated, or manual user classification methods. Note that the Aj(Ui) can be an elementary value of a set of elementary values. For example, the attribute Division of user Joe may equal {Software, Services} if Joe has responsibilities in both divisions.

3. Calculate the n×k attribute matrix A so that $A[i,j]=Aj(Ui)$, i.e., At[i,j] stores the value that attribute Aj has for user Ui as shown as 108.

4. At 110, test if the matrices AP and A are safe for use in the algorithm described in Part II, which automatically assigns access permissions to users. This safety test checks certain structural properties that AP and A must possess for the algorithm of Part II to produce high-quality results. Specifically, let α be a user-defined constant between 0 and 1. A small α-value (say α<0.1) is recommended to establish a strong and reliable form of safety. We now define: Two users Us and Ut have an identical set of attributes except for their identity (remember that A[i,1] always stores the user's identity) if $$A[s,2]=A[t,2] \text{ and } \ldots \text{ and } A[s,k]=A[t,k]. \quad (1)$$

The matrices AP and A are safe if for all user Us and Ut with identical attributes it holds that $$|AP[s,1]-AP[t,1]|+\ldots+|AP[s,m]-AP[t,m]| < \alpha \cdot m \quad (2)$$

In this formula, |x| designates the absolute value of x. Note that the left-hand side of formula (2) counts in how many access permissions the user Us and Ut differ even though they have all attributes (except their identity) in common. This number should be smaller than α·m for the matrices AP and A to be safe.

5. At 112, if the matrices AP and A are not safe, then they may have to be made safe or it is not advisable to use the algorithm of Part II to determine the access permissions of users. Making the matrices AP and A safe may be done by adding further and more descriptive user attributes Aj. Another way to make the matrices safe is to exclude users that destroy the safety property. This may be warranted if a few users are very unique in their access rights and have to be treated separately. If the matrices AP and A are safe then there does not exist a pair of users Us and Ut such that Us and Ut have an identical set of user attributes as defined by (1) and they have α·m or more different permission assignments.

Part II: Determining the Access Rights for a New User

Let U be a new user, and let $A1(U), \ldots, Ak(U)$ be its attribute values for his/her attributes $A1, \ldots, Ak$ as shown at 114, also referred to as $uA(1) \ldots uA(k)$. Below, we will define a similarity function sim(U, Ui), which measures the similarity between the user U and another user Ui based on their attribute values. sim(U, Ui) returns a value between 0 and 1 with 0 indicating identity and 1 maximal dissimilarity. Further, let β, $0 \leq \beta \leq 1$, be a user-defined constant, which we call the similarity threshold. Again, β should be small, for example, β<0.1.

Below, we also define a function newAP(s) that takes a set of $s \subseteq \{1, \ldots, n\}$ of indices as input and returns a vector $(p1 \ldots, pm) \in \{0,1\}^m$ of permissions which are derived from the permissions AP[i,*] of the users Ui with $i \in s$. This function incorporates the logic for deriving a new user's access rights from the access rights of existing users.

Definitions of the functions sim( ) and newAP( ), in one embodiment, will be given below. Independent of those specific definitions, we define the algorithm for determining a new user's access rights:

```
Input:    A new user U
Output:   A vector (p1,...,pm) ∈ {0,1}^m of permissions which define
that U shall have the access permission Pj if and only if pj=1 for all j=1..m.
    Algorithm:
    s = { };                  // set s to be the empty set
    for i=1 to n do {         // loop over all users Ui
        if sim(U,Ui) < β then {
            s = s + {i};      // add index i to sets
        }
    }
    p = newAP(s);
    return(p);
```

Algorithms for sim( ) and newAP( ) in one embodiment

The definition for sim(U,U') in one embodiment is as follows:

$$sim(U,U')=sqrt(simAttr^2(A2(U),A2(U'))+\ldots+simAttr^2(Ak(U')))$$

In this formula, sqrt( ) is the square root function and $simAttr^2(a,b)$ is the square of simAttr(a,b). Note that attribute A1 is not included in the calculation as it is the identity attribute.

The function simAttr(a,b) calculates the similarity between two attribute values a and b and is defined as follows:

Let Dom be the domain (i.e. set of possible values) of the first and second argument of simAttr( ), i.e., a, b ∈ Dom.

Case I: Dom is numeric. Many attributes are encoded in numeric values to simplify storage in directories. For example, instead of using the name "Purchasing Department", it may be listed as the department with number 4711. The serial number is another example of an attribute with a numeric domain. However, the relationship between two serial numbers is organization-specific. For example, the serial number may reflect the relative order of joining the company. It may also contain some additional information; a country code may be used as a prefix.

Dom=[s,t] for two numbers s and t, s<t.

$$simAttr(a,b)=|a-b|/(t-s)$$

Case II: Dom is non-numeric, but its elements have a natural order. The domain Dom={Associate, Assistant, Vice President, Director} would be an example.

Define an order function order( ) over Dom. This order function must make semantic sense in the domain Dom, i.e., capture a meaningful sense of order.

$$simAttr(a, b) = |order(a) - order(b)| / (\max(order(x): x \in Dom) - \min(order(x): x \in Dom))$$

Case III: Dom is a set of categorical, i.e., nonnumeric and unordered elements.

A domain expert is required to define is-a hierarchy over the elements in Dom. The leaves of this hierarchy are the elements in Dom, and the internal nodes are abstracted concepts.

Each internal node is to be labeled with a number between 0 and |Dom|, where |Dom| designates the number of elements in Dom. These labels are required to be monotonically increasing, i.e., the label of a parent node always has to be larger than or equal to the label of a child node. Leaves are labeled with zeros.

Let node x be the ancestor of the nodes a and b in the is-a hierarchy so that for any other ancestor y, x is a descendant of y. Let label(x) be the number that x is labeled with.

$$simAttr(a,b)=label(x)/|Dom|$$

Case IV: The elements of Dom are sets, i.e., the elements a and b, a, b $\in$ Dom, are both sets.

$$simAttr(a,b)=[E_{x \in a, y \in b} simAttr(x,y)]/(|a|*|b|)$$

with |a| and |b| designating the number of elements in set a and b, respectively.

At 116, determine a set of users having similar attributes as the new user, for instance, using the sim(U, U') described above. At 118, determine vector p of permissions for the new user, for instance, using the newAP(s) described below.

The function newAP(s) for a set $s \subseteq \{1, \ldots, n\}$ takes a user-defined parameter $\xi \in [0,1]$, which we call the support factor. An example of a good value for $\xi$ is around 0.65. We now define the preferred instantiation of newAP(s):

```
Input:    The set s ⊆ {1,...,n}
Output:   Permissions p = (p1,...,pm) ∈ {0,1}^m
Algorithm:
for j = 1 to m do {          // loop over all permissions
#u = number of users Ui, i ∈ s, that have permission Pj, i.e. for which
AP[i,j]=1;
    if #u ≥ ζ * |s| then {
        pj = 1;
    } else {
        pj = 0;
    }
}
return( (p1,...,pm) );
```

Variants and Generalizations

1. The same algorithms and methods described herein can also be employed when users are assigned roles rather than permissions. In this case, the matrix AP is such that AP[i,j]=1 if and only if user Ui has the role Rj, and AP[i,j]=0 otherwise.

2. A variant of Part I would execute the following algorithm after step 3 in order to calculate the matrices AP* and A*:

```
set Ap* and A* to be empty matrices;
for i = 1 to n do {
    if all attributes of user Ui are elementary (i.e., not set-valued) then {
        add AP[i,j], j=1..m, as the new last row to AP*;
        add A[i,j], j=1..k, as the new last row to A*;
    } else {                 // i.e., some attribute values are set-valued
        for every tuple t ∈ A[i, 1]x...xA[i,k] {
            append t as a new row to matrix A*;
            identify the permissions that user Ui
            exercises when acting in the "role" characterized by
            the attribute values of tuple t;
            append those permissions as a new row to AP*;
        }
    }
}
```

The result of this algorithm is that all attribute values in A* are elementary, while A can contain set-valued attribute values. More specifically, let aj $\in$ Dom(Aj), j=1 . . . k, be k attribute values with aj=A*[i,j] for all j and some i. As a result of the above algorithm, it then holds that AP*[i,1], . . . AP*[i, m] define the access permissions that the user with identity a1 has when acting in the role defined by the tuple t=(a1, . . . , ak).

For a variant, use the matrices AP* and A* instead of AP and A.

Examples of set-valued attributes are groups and roles. Often, a user is member of several groups or may act in different roles. Membership in projects is another example.

3. Variations of the similarity measure sim(U,U') are possible. In particular, the present disclosure covers variants that use weights w2, . . . , wk to weigh the importance of attributes in calculating similarity. One such variant may define:

$$sim(U,U')=sqrt(w2*simAttr2(A2(U),A2(U'))+ \ldots +wk*simAttr2(Ak(U),Ak(U')))$$

for suitably chosen weights w2 . . . , wk.

4. Variations of the function newAP(s) that determines a user's new access rights based on other users' access rights are possible. One possible variation may be the use of background knowledge on the use of certain permissions. This background knowledge can take the form of rules that define that some permissions may only be granted to some users or only under special circumstances (e.g., management approved need to know).

5. A further variant is that the permissions calculated by the algorithm in Part II are not applied directly but first reviewed by a human. Only after human approval are the access permissions enforced.

6. In the algorithm of Part II, the similarity threshold a may be found as the result of some try-and-error, where the results of different α-values are compared manually to see which one yields the best results. The same holds for the support factor $\xi$.

Figure 2:
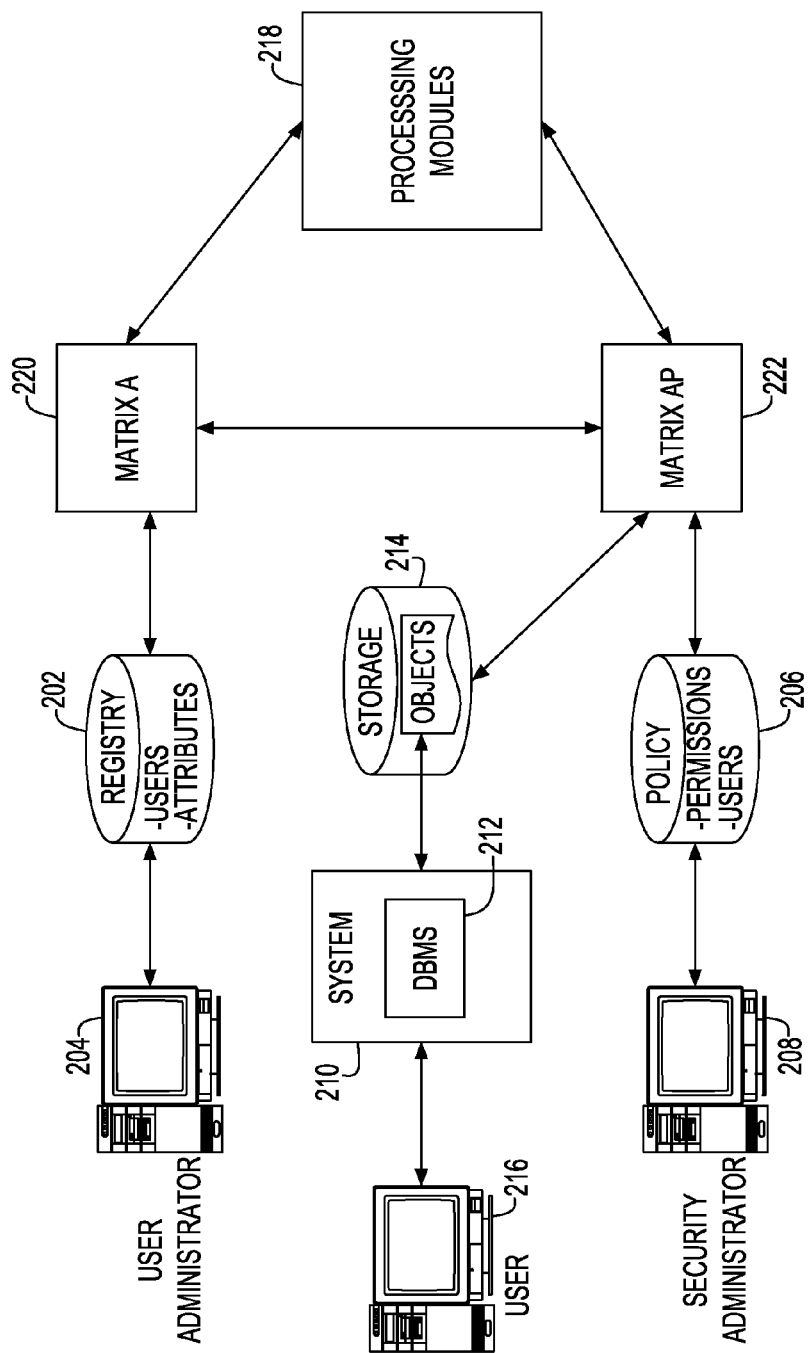
FIG. 2 is a system diagram illustrating system components of the present disclosure in one embodiment.

FIG. 2 is a system diagram illustrating system components of the present disclosure in one embodiment. A registry or database 202 stores a plurality of user information such as user attributes. A user administrator 204 or the like may maintain and/or administer, for example, create, update, delete, the information stored in the registry 202. The registry or database 202 may reside in one computer platform or across multiple platforms in a distributed computing environment. A policy database or registry 206 stores information associated with the access permissions that the users have. A security administrator 208 or the like may maintain and administer, for example, create, update, delete, the information stored in the policy registry 206. The policy registry or database 206 may reside in one computer platform or across multiple platforms in a distributed computing environment.

As an example, a computing environment includes computer system 210 performing various functions. The computer system 210, for example, may include a database management system 212 that accesses various storage items and objects 214. A user 216 performing his or her functions or roles accesses such objects 214 or others in the course of his or her work.

In one embodiment, one or more modules 218 of the present disclosure automatically determine the access permissions for a user, for example, a new user as described above, based on the existing user permissions 206 and the attributes associated with the users 202. For example, the one or more modules generate user attribute matrix A 220 that describes or stores one or more attributes associated with each user as described above. The one or more modules 218 also generate access permission matrix AP 222 that describes or stores access permissions associated with users. The matrices A 220 and AP 222 may be pre-generated, dynamically and periodically updated as changes occur in the user information (attributes) and permissions. Using the matrices A and AP, one or more modules 218 determine the access permission of a new user, for example, using the above-described algorithms. The matrices A 220 and AP 222 may be stored on a computer readable medium such as RAM, hard disk, and/or any computer storage device, for example, readable or accessible by the one or more modules 218. The one or more modules may 218 reside and/or run in any platform, for example, user administrator's system, user's system, and/or security administrator's system or in another system, or in combination of one or more systems in a distributed manner.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
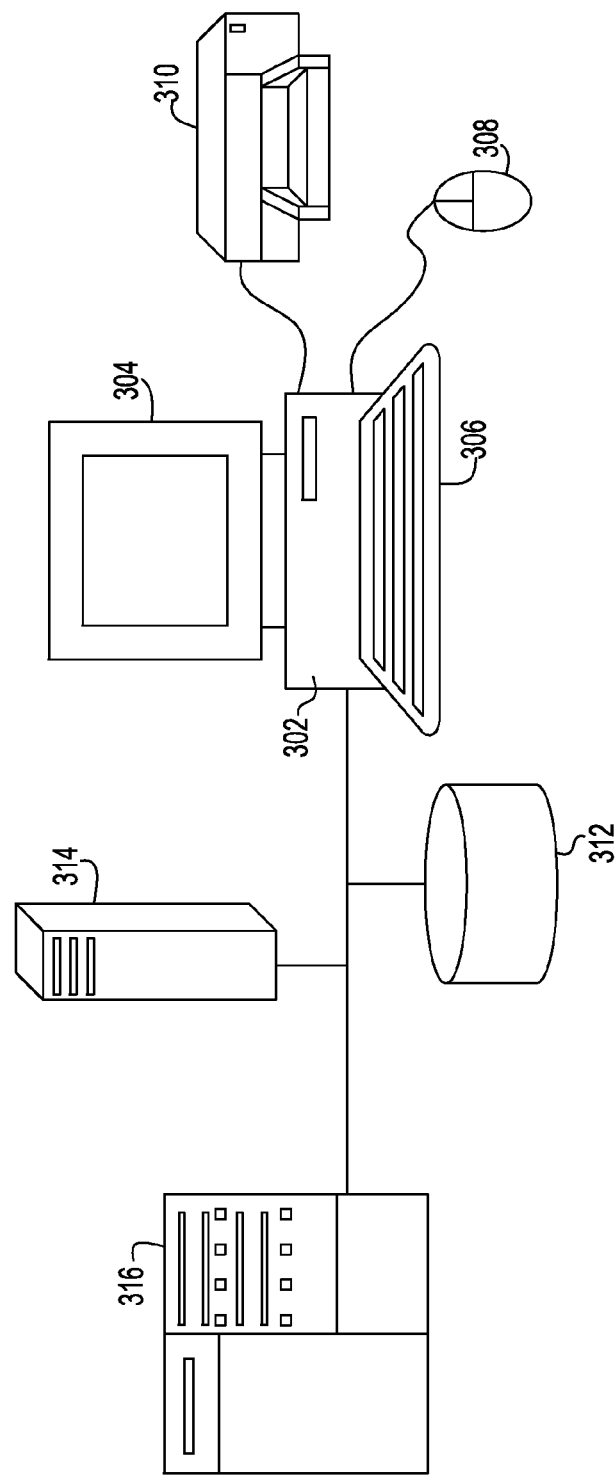
FIG. 3 is a diagram illustrating an example of computer system architecture for carrying out the system and method of the present disclosure in one embodiment.

Referring now to FIG. 3, the systems and methodologies of the present disclosure may be carried out or executed in a computer system that includes a processing unit 320, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 320 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 318), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for automatically assigning access permissions, comprising:

determining permission matrix AP, wherein AP(i,l) is set if user U(i) has access permission P(l), i representing an index from 1 to n number of users and l representing an index from 1 to m number of permissions;

determining attribute matrix A, wherein A(i,j) stores j-th attribute associated with user U(i), j representing an index from 1 to k number of user attributes;

determining one or more attributes associated with a new user;

determining one or more users from the attribute matrix A that have similar attributes as the new user;

determining one or more access permissions from the permission matrix AP for said one or more users; and generating, by a processor, a permission vector $p(1, \ldots, m)$ for the new user from said determined access permissions of said one or more users, wherein access rights of the new user are automatically determined based on access rights held by said one or more users determined to have similar attributes as the new user, wherein the step of determining one or more users that have similar attributes as the new user comprises:

generating a set s and initializing the set s as an empty set;

for each user U(i), computing similarity between a plurality of attributes of U(i) and a plurality of attributes of the new user; and adding to the set s, index i if it is determined that for user U(i) the computed similarity is less than a predetermined similarity threshold.

2. The method of claim 1, wherein the plurality of attributes of U(i) comprises all attributes of U(i) and the plurality of attributes of the new user comprises all attributes of the new user.

3. The method of claim 2, wherein the predetermined similarity threshold is determined using trial and error technique.

4. The method of claim 2, wherein the similarity is computed by summing square of difference between each attribute associated with U(i) and corresponding attribute associated with the new user and taking square root of the sum of the square.

5. The method of claim 2, wherein the similarity is determined by summing weighted square of difference between each attribute associated with U(i) and corresponding attribute associated with the new user and taking square root of the sum of the square.

6. The method of claim 2, wherein the similarity is determined by:

for each attribute associated with U(i),
  determining difference between said each attribute associated with U(i) and corresponding attribute associated with the new user;
  dividing the difference by domain difference; and
  squaring the divided value;
summing the squared values associated with all U(i); and
taking square root of the sum of the squared value.

7. The method of claim 6, wherein the domain difference is determined using an order function of all possible attribute values in a given attribute j.

8. The method of claim 6, wherein the domain difference is determined using a domain expert.

9. The method of claim 2, wherein the step of generating a permission vector p(1, ..., m) for the new user includes:
defining a support factor;
for each l=1 to m, determining total number of users in set s that has l-th permission, and if the total number of users is greater than or equal to the support factor multiplied by ordinal of the set s, then setting vector p(l) for the new user as having the l-th permission, otherwise setting vector p(l) for the new user as not having the l-th permission.

10. The method of claim 9, wherein the support factor is a number between 0 and 1, inclusive.

11. The method of claim 9, wherein the step of generating a permission vector p(1, ..., m) for the new user further includes:
using one or more rules based on background knowledge to set vector p(l).

12. The method of claim 9, wherein the support factor is determined using trial and error technique.

13. The method of claim 1, further including:
testing if the matrix AP and matrix A meet a test threshold for use in automatically assigning access permissions to users.

14. The method of claim 13, wherein the step of testing if the matrix AP and matrix A meet a test threshold for use in automatically assigning access permissions to users includes:
defining the test threshold;
determining users s and t that have same attributes;
summing absolute values of differences of AP(s, l) and AP(t, l);
if the summed value is less than the test threshold multiplied by the total number of permissions m, determining that the matrix AP and matrix A qualify for use in automatically assigning access permissions to users.

15. The method of claim 14, wherein if the summed valued is not less than the test threshold multiplied by the total number of permissions m, making the matrix AP and matrix A meet the test threshold.

16. The method of claim 15, wherein the making includes adding additional one or more user attributes to matrix A.

17. The method of claim 15, wherein the making includes deleting one or more users U(i) determined to disqualify the matrix AP and matrix A from meeting the test threshold.

18. The method of claim 1, wherein said steps are used to assign user roles and said access permissions are user roles.

19. A system for automatically assigning access permissions to users, comprising:
a hardware processor;
a plurality of users U(i) of an information technology system S, wherein i represents an index from 1 to n number of users;
a plurality of permissions P(l), wherein l represents an index from 1 to m number of permissions established in the information technology system S;
matrix AP, wherein AP(i, l) is set if user U(i) has access permission P(l) and AP(i, l) is not set if user U(i) does not have access permission P(l);
one or more user attributes uA(1) to uA(k), where k is a number of defined attributes;
a first module, operable to execute on the processor and further operable to determine for each user U(i) attribute values of said one or more user attributes uA(1) to uA(k), said first module further operable to determine n×k attribute matrix A, wherein A(i, j) stores attribute value of uA(j) attribute associated with user U(i), wherein j represents an index from 1 to k number of attributes, said first module further operable to test if the matrix AP and matrix A meet a test threshold for use in automatically assigning access permissions to users; and
a second module, operable to execute on the processor and further operable to establish said one or more user attributes uA(1) to uA(k) for a new user U and assign attribute values of uA(1) to uA(k) to the new user U, said second module further operable to determine one or more user U(i) that has similar attribute values to the attribute values of the new user U, said second module further operable to determine access permission P(l) using the AP matrix for each of said one or more user U(i) that has similar attribute values, said second module further operable to generate a permission vector p(1, ..., m) for the new user U from using the access permission P(l) associated with said one or more user U(i) that has similar attributes values,
wherein access rights of the new user are automatically determined based on access rights held by said one or more users determined to have similar attributes as the new user.

20. A non-transitory program storage device readable by a machine, tangibly embodying a program of instructions executable by the machine to perform a method for automatically assigning access permissions, comprising:
determining permission matrix AP, wherein AP(i,l) is set if user U(i) has access permission P(l), i representing an index from 1 to n number of users and l representing an index from 1 to m number of permissions;
determining attribute matrix A, wherein A(i,j) stores j-th attribute associated with user U(i), j representing an index from 1 to k number of user attributes;
determining one or more attributes associated with a new user;
determining one or more users from the attribute matrix A that have similar attributes as the new user;
determining one or more access permissions from the permission matrix AP for said one or more users; and
generating a permission vector p(1, ..., m) for the new user from said determined access permissions of said one or more users,
wherein access rights of the new user are automatically determined based on access rights held by said one or more users determined to have similar attributes as the new user,
wherein the step of determining one or more users that have similar attributes as the new user comprises:
generating a set s and initializing the set s as an empty set;
for each user U(i), computing similarity between a plurality attributes of U(i) and a plurality of attributes of the new user; and
adding to the set s, index i if it is determined that for user U(i) the computed similarity is less than a predetermined similarity threshold.

21. The program storage device of claim 20,
wherein the plurality of attributes of U(i) comprises all attributes of said U(i) user and the plurality of attributes of the new user comprises all attributes of the new user.

22. The program storage device of claim 21, wherein the similarity is computed by summing square of difference between each attribute associated with U(i) and corresponding attribute associated with the new user and taking square root of the sum of the square.

23. The program storage device of claim 21, wherein the similarity is determined by summing weighted square of difference between each attribute associated with U(i) and corresponding attribute associated with the new user and taking square root of the sum of the square.

24. The program storage device of claim 21, wherein the step of generating a permission vector p(1, ... , m) for the new user includes:
- defining a support factor;
- for each l=1 to m, determining total number of users in set s that has l-th permission, and if the total number of users is greater than or equal to the support factor multiplied by ordinal of the set s, then setting vector p(l) for the new user as having the l-th permission, otherwise setting vector p(l) for the new user as not having the l-th permission.

25. The program storage device of claim 20, further including testing if the matrix AP and matrix A meet a test threshold for use in automatically assigning access permissions to users, wherein the step of testing if the matrix AP and matrix A meet a test threshold for use in automatically assigning access permissions to users includes:
- defining the test threshold;
- determining users s and t that have same attributes;
- summing absolute values of differences of AP(s, l) and AP(t, l);
- if the summed value is less than the test threshold multiplied by the total number of permissions m, determining that the matrix AP and matrix A qualify for use in automatically assigning access permissions to users.

* * * * *